July 18, 1967          P. L. VELTMAN          3,331,675

METHOD FOR KILLING POTATO VINES WITH AMMONIA

Filed April 29, 1964

PRESTON L. VELTMAN
— INVENTOR

BY Charles L. Harness

ATTORNEY 3,331,675
METHOD FOR KILLING POTATO VINES WITH AMMONIA
Preston L. Veltman, Severna Park, Md., assignor to W. R. Grace & Co., New York, N.Y., a corporation of Connecticut
Filed Apr. 29, 1964, Ser. No. 363,570
3 Claims. (Cl. 71—2.13)

This is a continuation-in-part of copending patent application Serial Number 260,118, filed February 21, 1963 now abandoned.

This invention relates to the treatment of living plants. In one specific aspect it relates to a chemical process for killing potato vines before harvesting the potato crop.

In summary, this invention involves an improved process for killing potato vines previous to harvesting the potato crop comprising contacting said vines with ammonia by confining said vines in a hood, open at front and rear, and moving along the crop row at about 2–10 miles per hour while feeding ammonia into said hood at a rate effective to kill said vines via at least one ammonia port positioned in the fore portion of said hood about a foot behind the front entrance of said hood, whereby the potatoes harvested from the thus killed vines are, when peeled and sliced, substantially resistant to darkening on exposure to the air.

Preferred embodiments include the use of hood speeds of about 2–4 miles per hour while feeding ammonia at about 8–18 lbs. per acre and the use of hood speeds of about 5–7 miles per hour while feeding ammonia at the rate of about 13–32 lbs. per acre.

While I prefer to feed ammonia into the hood of the apparatus used in the process of my invention in the form of a mist, or aerosol, of micron-size droplets of liquid anhydrous ammonia, I have obtained excellent results when feeding ammonia vapor into said hood. Ammonia vapor can be prepared by the conventional procedure. (See U.S. Patent 3,095,298.)

Figure 1:
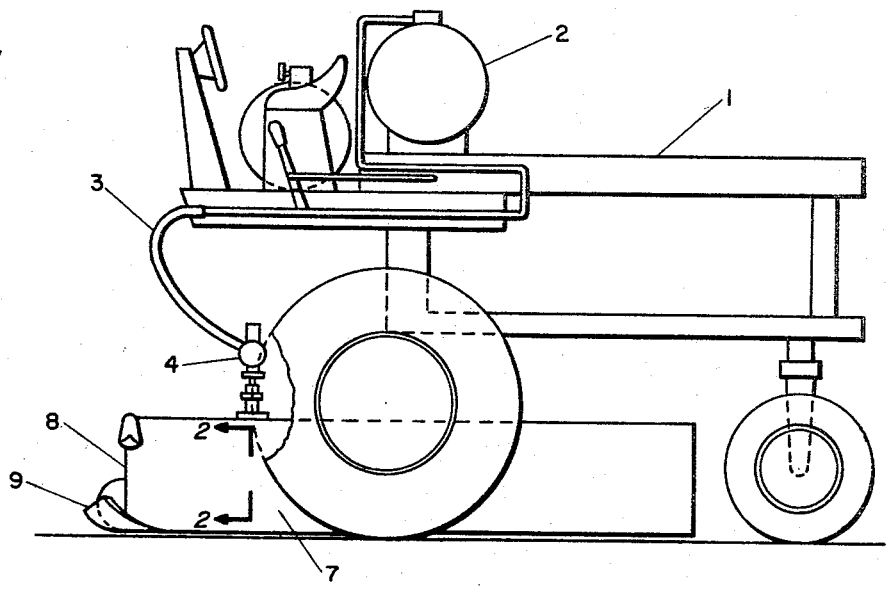
Figure 2:
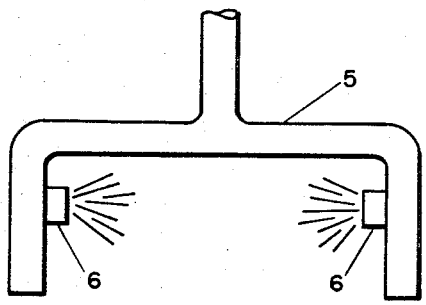

In the drawings: FIG. 1 shows the hood used in the process of this invention mounted on a tractor carrying a supply of ammonia. FIG. 2 shows a preferred ammonia feed assembly, being that portion of FIG. 1 taken in section along 2—2.

In the commercial growing of potatoes, it is economically desirable to kill the vines about 1–3 weeks prior to harvesting the potatoes. The dead vines are mowed with a rotary mower which chops said vines into very small particles after said vines have become dry and before digging the potatoes. The potatoes are dug mechanically and separated from particles of chopped vines and soil by screening on a grizzly. The small particles of dead vines pass through the grizzly with the soil particles while the potatoes are retained by said grizzly. If the vines were not killed prior to the mowing treatment, many of the vine particles would be so large that they would not pass through the grizzlies but would remain with the potatoes or would plug the grizzlies, thereby causing large quantities of soil and chopped vines to remain with the potatoes. It has been found that at least about a week is required for the potato skins to harden or set after the vines have been killed. If the potatoes are dug too soon after killing the vines, i.e., before the skins have set, the digging and screening will bruise the potatoes. At the present time sodium arsenite, a dangerous poison, is used to kell potato vines before harvesting the crop. The arsenic treatment is objectionable due to the toxicity of arsenic to man and animals and due to the fact that arsenic residues delay replanting of the treated fields.

I have found that killing potato vines with ammonia, rather than with sodium arsenite or other arsenic compounds, produces an additional surprising and entirely unexpected beneficial result without harming the potato crop in any manner. To wit, potatoes, harvested after the vines had been killed with ammonia, were substantially more resistant to darkening, or blackening, (including blackening of the vascular ring of the potato tuber) than potatoes harvested from vines killed with sodium arsenite or from vines that have not been killed. It is well known that potatoes peeled or sliced and exposed to the air rapidly darken, thereby making the potatoes appear less appetizing. Said darkening is particularly objectionable in the case of potatoes which are used for making potato chips. My finding that killing potato vines with ammonia substantially reduces the tendency of peeled and sliced potatoes to darken on standing was completely unobvious to those skilled in the art.

It is the object of this invention to provide a means for killing potato vines previous to harvesting the potato crop. It is another object of this invention to kill said vines with ammonia, a well known fertilizer material, previous to harvesting the potato crop. It is another object of this invention to replace dangerous and toxic sodium arsenite (which is now used extensively to kill potato vines) with ammonia as reactant for killing said vines previous to harvesting the potato crop.

In the parent case, Serial Number 260,118, filed February 21, 1963, the use of an aerosol of liquid anhydrous ammonia, generated by mechanical nozzles, to defoliate potato plants was disclosed. I have now found that ammonia can be used to kill potato vines previous to harvesting the potato crop. Ammonia for this purpose can be applied as vapor or as a mist, or aerosol, of micron-size droplets of liquid anhydrous ammonia. The small droplets of liquid anhydrous ammonia can be produced by mechanically driven nozzles, as described in copending application Serial Number 260,118, or by passing liquid anhydrous ammonia through ordinary garden type nozzles which disintegrate said ammonia into micron-size droplets.

Whether using liquid anhydrous ammonia or ammonia vapor to kill potato vines, I have found that the ammonia can be fed into the hood via one or more ammonia ports located in the forward portion of said hood. When using ammonia vapor, the ammonia ports can be sparger pipes or pipes capped at the end with one or more holes drilled into said pipes, thereby permitting ammonia to pass from said pipes, via said holes, into the hood. When using liquid anhydrous ammonia to kill the potato vines, nozzles are used as ammonia ports. Said nozzles can be mechanically driven nozzles, e.g., injection nozzles or rotating nozzles, or simply garden type nozzles.

FIG. 1 shows the apparatus used in a preferred embodiment of the process of my invention. The apparatus and ammonia source are mounted on a tractor 1. It will be readily apparent to those skilled in the art that a truck, trailer, wagon, or the like can be substituted for the tractor. Liquid anhydrous ammonia passes from ammonia cylinder 2, via line 3 and pressure regulator 4 to ammonia header 5 from which said ammonia passes through nozzles 6, into hood 7. Said nozzles are positioned about a foot behind front entrance 8 of hood 7, preferably in the upper third of said hood. Said hood is about 7–10 feet in length, preferably about 8 feet. If the distance from nozzles 6 to entrance 8 is substantially less than about a foot, ammonia tends to escape through entrance 8, thereby decreasing the concentration of the ammonia in the hood and contaminating the air about the apparatus with ammonia fumes to the discomfort of (or danger to) the operator. If the distance between nozzles 6 and entrance 8 is substantially greater than a foot, the effective working length of the hood is reduced, thereby reducing the residence time for each individual potato vine in the hood. This would necessitate the use of a longer hood or moving the hood along the potato row at a slower speed. The aforesaid positioning of the ammonia nozzles, or ports, applies when feeding ammonia into the hood as vapor or as a mist, or aerosol, of liquid anhydrous ammonia.

While the front entrance, or mouth of the hood used in the process of this invention can be flared, I have found that a flare is unnecessary if the hood is equipped with lifting guide arms (shown at 9 in FIG. 1).

In many instances, the diameters of the liquid ammonia droplets are typically 100–500 microns, since said droplets vaporize almost instantaneously; however, during the course of the application the mean particle diameter necessarily diminishes to zero very quickly, so, as a matter of fact, the effective mean particle size can be much smaller than the 100–500 micron initial range and still be absolutely effective.

My invention is illustrated further by the following examples which are illustrative only and which are not intended to limit the scope of the invention.

*Example I*

A mist of micron-size particles of liquid anhydrous ammonia was fed at the rate of 36 lbs. per acre into the fore portion of a hood as said hood moved lengthwise along a potato row at a speed of 4 miles per hour. Since the hood was 8 feet long, residence time under the hood was about 1.4 seconds. Said ammonia was fed into the hood via 2 standard, commercially available, garden spray nozzles, designed to atomize liquids under pressure, which were placed in the fore portion of the hood, about 1 foot from the forward entrance of said hood. Said nozzles served as ammonia ports. Within about 1.5–2 hours, the treated potato vines began to turn dark and within 24 hours all of said vines were dead.

*Example II*

The apparatus and general procedure of Example I was used, but in this instance the hood speed was 6 miles per hour. Residence time was about 0.9 second, and the ammonia feed rate was 27 lbs. per acre. Within about 2 hours after treatment, the treated potato vines turned dark in color and within 24 hours all the treated vines were dead.

*Example III*

The apparatus and general procedure of Example I was used, but in this instance the ammonia feed rate was 21 lbs. per acre, and the hood speed was about 6 miles per hour. Results were substantially the same as those obtained in Example I.

*Example IV*

The apparatus and general procedure of Example I was used, but in this instance the hood speed was 2 miles per hour and the ammonia rate was 18 lbs. per acre. Results of this run were substantially the same as those obtained in Example I.

*Example V*

The apparatus and general procedure of Example I was used, but in this instance hood speed was 4 miles per hour and ammonia feed rate was 9 lbs. per acre. Results were substantially the same as those obtained in Example I.

*Example VI*

The apparatus and general procedure of Example I was used, but in this instance the hood speed was 6 miles per hour and the ammonia rate was 11 lbs. per acre. The treated plants turned dark within about 2 hours after treatment. After 24 hours approximately two-thirds of the treated plants were dead, and after 48 hours at least about 95% of the treated plants were dead.

*Example VII*

The apparatus and general procedure of Example I was used, but in this instance hood speed was about 6 miles per hour and the ammonia feed rate was 13 lbs. per acre. Within about 2 hours after treatment, the treated vines had turned dark, and within 24 hours all of the treated vines were dead.

*Example VIII*

The apparatus and general procedure of Example I was used, but in this instance the hood speed was 2 miles miles an hour and ammonia was applied at the rate of 72 lbs. per acre. Results of this test were indistinguishable from those obtained in Example I.

*Example IX*

The general procedure of Example I was used, but in this instance the ammonia was fed as ammonia vapor through spargers located about 1 foot behind the forward entrance of the hood. Hood speed was 4 miles per hour and ammonia rate was 36 lbs. per acre. Results of this run were substantially identical to those obtained in Example I.

I have found that the ammonia feed rate required to kill substantially all of the treated potato vines is a function of residence time of the individual plants within the hood, and residence time is, in turn, a function of hood speed. Thus, it is not possible to prescribe an effective ammonia rate independent of hood speed. For example, when using an ammonia rate of 9 lbs. per acre and a hood speed of 4 miles per hour all contacted potato vines were dead within 24 hours (Example V) while an ammonia rate of 11 lbs. per acre at a hood speed of 6 miles per hour was less effective (Example VI).

What is claimed is:

1. Process for killing potato vines previous to harvesting the potato crop comprising contacting said vines with amomnia by confining said vines in a hood, open at front and rear and moving along the crop row at about 2–10 miles per hour, while feeding ammonia into said hood at a rate effective to kill said vines and to substantially eliminate the tendency of potatoes harvested from the thus killed vines to darken on peeling, slicing, and exposing to air via at least one ammonia port positioned in the fore portion of said hood about a foot behind the front entrance of said hood, said amonia feed rate being about 8–18 lbs. per acre.

2. The process of claim 1 in which ammonia is fed into the hood as ammonia vapor.

3. The process of claim 1 in which ammonia is fed into the hood as a mist of micron-size droplets of liquid anhydrous ammonia.

References Cited

UNITED STATES PATENTS

| | | | |
|---|---|---|---|
| 2,285,932 | 6/1942 | Leavit | 71—2.5 |
| 3,095,298 | 6/1963 | Fisher et al. | 71—2.2 |
| 3,238,667 | 3/1966 | Remmert | 47—1.7 |
| 3,238,668 | 3/1966 | Abbott et al. | 47—1.7 |
| 3,238,669 | 3/1966 | Remmert | 47—1.7 |
| 3,238,670 | 3/1966 | Mahl et al. | 47—1.7 |
| 3,250,597 | 5/1966 | Mahl et al. | 47—1.7 |

LEWIS GOTTS, *Primary Examiner.*

JAMES O. THOMAS, Jr., *Examiner.*

A. J. ADAMCIK, *Assistant Examiner.*